(12) United States Patent
Saarinen et al.

(10) Patent No.: US 9,003,987 B2
(45) Date of Patent: Apr. 14, 2015

(54) VESSEL OR FLOATING STRUCTURE OPERATING IN ICE-COVERED WATERS AND METHOD OF USING IT

(75) Inventors: Sami Saarinen, Helsinki (FI); Tom Mattsson, Helsinki (FI); Riku Kiili, Helsinki (FI)

(73) Assignee: Aker Arctic Technology Inc., Helsinki (FI)

( * ) Notice: Subject to any disclaimer, the term of this patent is extended or adjusted under 35 U.S.C. 154(b) by 206 days.

(21) Appl. No.: 13/255,197

(22) PCT Filed: Feb. 25, 2010

(86) PCT No.: PCT/FI2010/050138
§ 371 (c)(1),
(2), (4) Date: Sep. 7, 2011

(87) PCT Pub. No.: WO2010/103170
PCT Pub. Date: Sep. 16, 2010

(65) Prior Publication Data
US 2012/0031318 A1    Feb. 9, 2012

(30) Foreign Application Priority Data
Mar. 12, 2009    (FI) ..................... 20095254

(51) Int. Cl.
*B63B 35/08* (2006.01)

(52) U.S. Cl.
CPC ..................... *B63B 35/08* (2013.01)

(58) Field of Classification Search
CPC ....................................... B63B 35/08
USPC ....................................... 114/40–43
See application file for complete search history.

(56) References Cited

U.S. PATENT DOCUMENTS

| | | | |
|---|---|---|---|
| 3,521,590 A | 7/1970 | German et al. | |
| 3,762,354 A * | 10/1973 | Waas | 114/41 |
| 3,817,199 A | 6/1974 | Schirtzinger | |
| 3,850,125 A * | 11/1974 | Anders | 114/40 |
| 3,878,804 A * | 4/1975 | Legerer | 114/40 |
| 3,931,780 A | 1/1976 | Wass | |
| 3,977,345 A * | 8/1976 | Worthing | 114/40 |
| 4,152,999 A | 5/1979 | Oshima et al. | |
| 4,276,845 A | 7/1981 | Spanner | |
| 4,434,741 A | 3/1984 | Wright et al. | |
| 4,543,900 A | 10/1985 | Aker | |
| 5,036,781 A | 8/1991 | Jaervi | |

FOREIGN PATENT DOCUMENTS

| | | |
|---|---|---|
| DE | 22 46 173 A1 | 3/1973 |
| DE | 75 34 838 U | 6/1976 |

(Continued)

*Primary Examiner* — Daniel V Venne
(74) *Attorney, Agent, or Firm* — Muncy, Geissler, Olds & Lowe, P.C.

(57) ABSTRACT

The invention relates to a vessel or a floating structure operating in ice-covered waters comprising a hull or the like (1, 1') including at least one bow-like end or a similar hull portion (2, 2'), which is exposed to the loading effect of the ice, while the ice or the vessel is moving. Said bow-like end or a similar hull portion (2, 2'), in the underwater part of the hull, is equipped with means for leading one or several strong, mainly upwards-directed flows of water towards the ice or the ice field encountered by the bow-like end or a similar hull portion (2, 2'). The invention also relates to a method of using the vessel or the floating structure.

11 Claims, 5 Drawing Sheets

(56) References Cited

FOREIGN PATENT DOCUMENTS

| | | |
|---|---|---|
| DE | 7534838 | 6/1976 |
| JP | 48-99886 A | 12/1973 |
| JP | 51-16393 A | 2/1976 |
| JP | 58-180393 A | 10/1983 |
| JP | 60-168694 U | 11/1985 |
| JP | 61-12487 A | 1/1986 |
| JP | 61-154187 U | 9/1986 |
| JP | 2003-252282 A | 9/2003 |
| KR | 20070118990 | 12/2007 |
| SU | 1206172 | 1/1986 |
| WO | WO 2007/089152 A1 | 8/2007 |
| WO | WO 2008/116964 A1 | 10/2008 |

* cited by examiner

VESSEL OR FLOATING STRUCTURE OPERATING IN ICE-COVERED WATERS AND METHOD OF USING IT

The invention relates to a vessel or a floating structure operating in ice-covered waters according to the preamble of claim 1, which vessel or installation comprises a hull or the like including at least one bow structure bow-like end or a similar hull portion, which is exposed to a the loading effect of ice, while the ice or the vessel is moving. The invention also relates to a method according to the preamble of claim 12 of using the vessel or the floating structure.

Oil prospecting and drilling activities in ice-covered sea areas are carried out by utilising different kinds of vessels and floating structures, such as oil drilling rigs. Especially in a so-called drilling ship, the hull of the vessel is provided with a drilling derrick and drilling means. In order to maintain the position of the vessel it needs to be anchored. For this purpose, different kinds of anchoring wire systems, which extend via the bottom of the vessel to the sea bottom, are used. In addition, for maintaining the position of the vessel, the propulsion systems of the vessel, so-called rudder propeller devices in particular, can be used as assistance. In these conditions, the ice masses moving along with the wind and/or the sea currents are a source of serious problems. Firstly, ice is packed and cracked up against the hull of the vessel or the floating structure and it tends to move the vessel away from its operating area. Single blocks of crushed or cracked-up ice drift easily under the vessel, where they may damage the drilling equipment and other devices susceptible to damage. Further, the ice blocks hamper the operation of the propulsion devices of the vessel. These problems, as such, can be prevented more economically, if the floating structure is shaped as a ship, i.e. it is elongated and relatively narrow, whereby it can be steered against the approaching ice masses. In this context, the bow-like end or the bow of the structure refers to that particular hull portion of the floating structure that encounters the ice load.

The patent document WO 2007/089152 A1 discloses a solution related to a vessel, where special means to break up ice arranged at one end of the vessel are used together with the propulsion bodies to break up ice and to move the blocks away. In this kind of an arrangement the devices are, however, susceptible to strong forces generated by the ice and to breakage.

The patent application WO2008/116964 discloses propulsion devices to be arranged in the front part of the vessel, which devices can be used for pushing the vessel towards the ice field. Also in this case, the devices are, however, susceptible to breakage. They also tend to drive the ice blocks under the vessel.

Solutions have also been suggested for reducing the friction between the ice and the ship hull. The document U.S. Pat. No. 3,580,204 discloses an air blowing arrangement for leading air bubbles between the ice and the side of the vessel in order to facilitate the travel of the vessel in ice-filled waters.

It is possible, as such, to protect the arrangements and devices adapted on the bottom of the vessel, for instance by arranging protecting skirts around the devices susceptible to damage.

A purpose of the invention is to provide a novel arrangement, by means of which the above-mentioned problems related to oil prospecting and drilling activities taking place in ice-covered waters may be decreased or prevented more efficiently than before. A special purpose of the invention is to provide a structural conception to be applied to a vessel or a floating structure, by means of which conception the problems caused by the ice field can be solved as simply and as economically as possible so that the vessel or the floating structure can be maintained in its operating position in spite of the pressures exerted by the ice field, and at the same time its structures can be prevented from breaking down.

The objects of the invention are primarily achieved as disclosed in the appended claims 1 and 12, and more closely as explained in the other claims. According to the invention, said bow-like end or a similar hull portion, in the underwater part of the vessel or the floating structure, is equipped with means for leading one or several strong, mainly upwards-directed flows of water towards the ice or the ice field encountered by the bow-like end or a similar hull portion. Thus, depending on the shape of the bow-like end or a similar hull portion in each case, the flow of water is, according to the invention, directed either straight or obliquely upwards.

The present solution makes it possible to provide a strong and relatively economical, efficient and easily feasible flow of water directed to the area of a bow-like end or a similar hull portion of a vessel in order to break ice and to wash it away from the hull by utilising one or several essentially vertical flow channels. A pump or a propeller mounted in the channel generates a strong water flow upwards. Water is taken preferably from underneath the bottom of the vessel or from the direction of the bottom through one or several openings respectively. In this manner, it is possible to prevent clogging of the channel or channels. The water jet is directed upwards or partially to the sides, or forward.

A strong water flow contributes to the breaking of solid ice and washes the ice blocks as well as the ice floes in the broken ice field away from the vessel or the floating structure thus providing an ice-free area in front of the vessel or the floating structure. The flow affects also the friction between the hull and the ice precisely in the area of the bow-like end, where the impact of the ice is at largest. This results in a situation, where the total load exerted by the ice is smaller and the drifting of ice blocks under the hull is avoided.

By efficient washing of the ice it is possible to maintain the position of the vessel or to make it travel slowly in the moving ice field, thus reducing the ice forces. By means of the present solution also the accumulation of ice in front of vessels with bulbs, such as tankers, when advancing in an ice lane, can be prevented and the resistance caused by the ice reduced. The solution enables a more efficient use of a bow designed for open water conditions also in ice-filled conditions. The arrangement does not comprise any protruding parts susceptible to breakage.

Other advantages can be achieved, for instance, by directing the water channels obliquely upwards so that they can be utilised also for steering the vessel in open water conditions.

In order to make the ice breaking more efficient, the bow-like end exposed to the loading effect of the ice is preferably shaped so as to be bevelled with respect to the sea level in the vicinity thereof. In addition, the submerged portion that sticks out with respect to the waterline of the hull is shaped so as to be bevelled with respect to the sea level in the vicinity thereof.

The invention can be utilised e.g. in following applications: drilling ships requiring DP ability (dynamic positioning), i.e. ability to maintain the position in shifting conditions, production vessels, "slow" vessels with bulbs attached to a loading tower in a loading situation; also the above-mentioned ships in anchor and during slow advancing in ice-filled waters, semisubmersible oil drilling rigs, and other floating structures. The solution may also be applied as retrofitting for existing vessels with bulbs.

In the following, the invention will be explained by way of example with reference to the appended schematic drawings, of which FIG. 1 shows the principle of one bow-like end of a vessel or a floating structure according to the invention seen obliquely from below;

Figure 1:
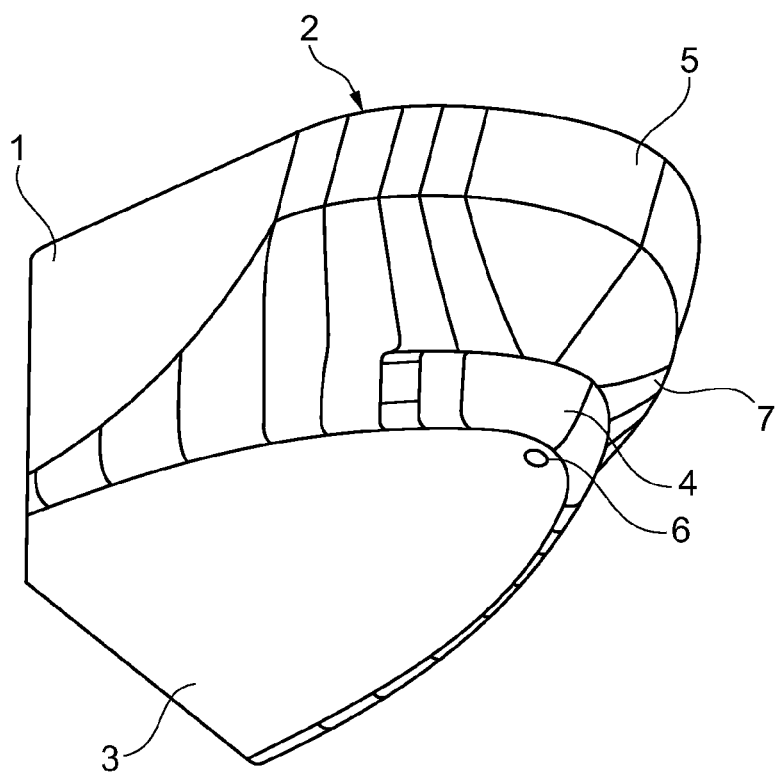
Figure 2:
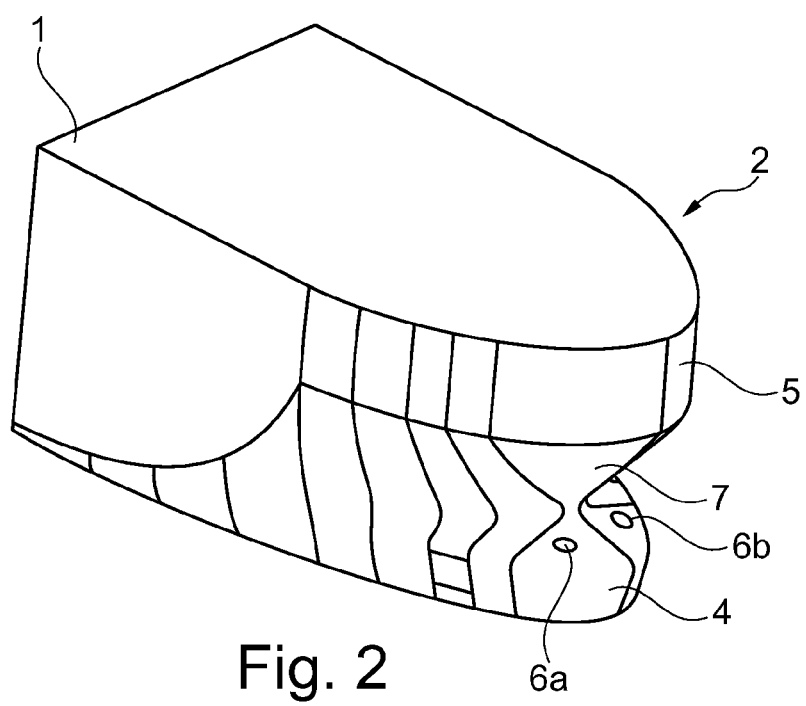
FIG. 2 shows the bow-like end of FIG. 1 seen obliquely from above.
Figure 3:
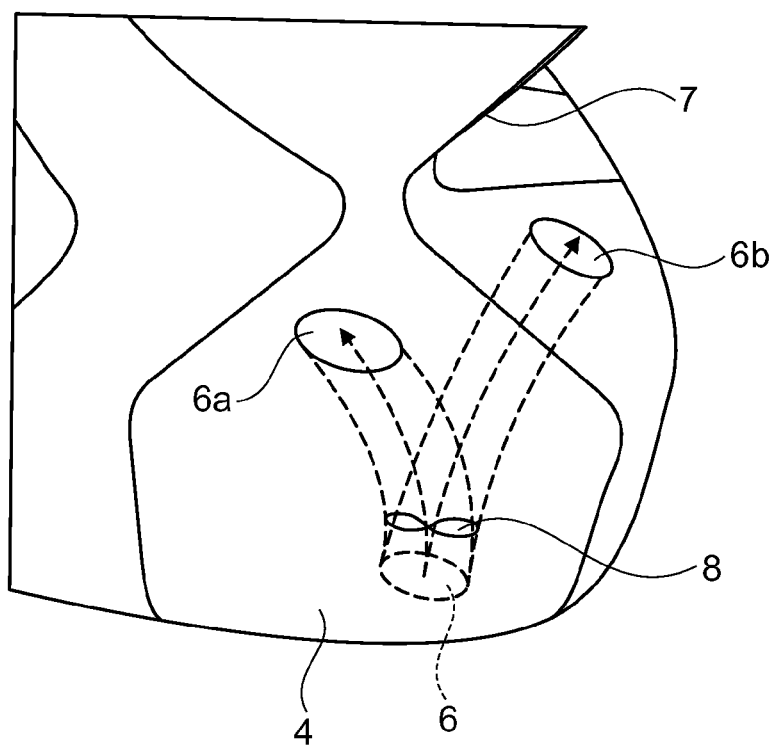
FIG. 3 shows an enlarged view of the bow-like end of FIG. 2.
Figure 4:
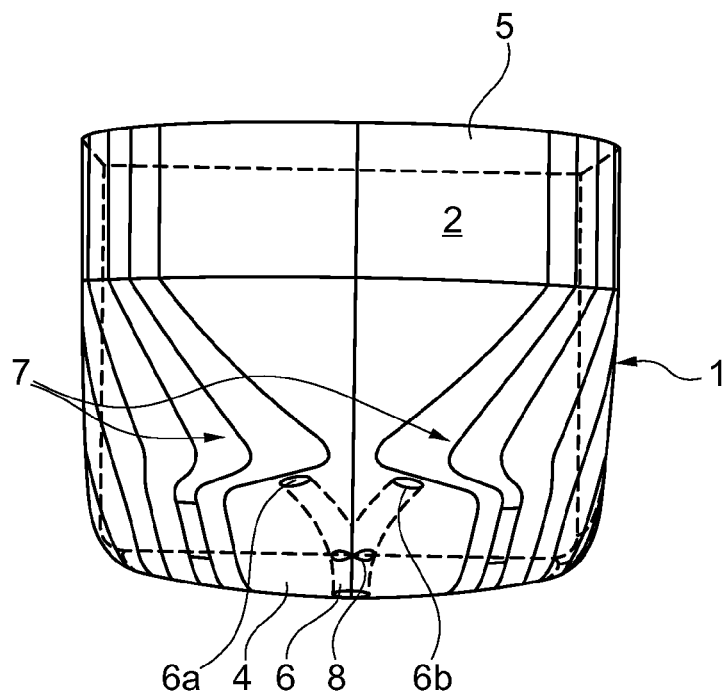
FIG. 4 shows the bow-like end of FIG. 1 seen straight from ahead.
Figure 5:
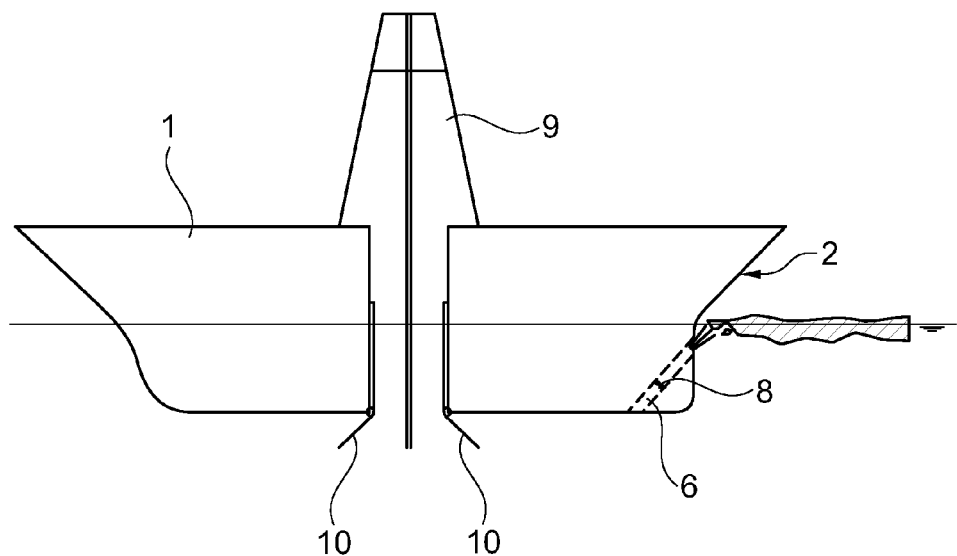
Figure 6:
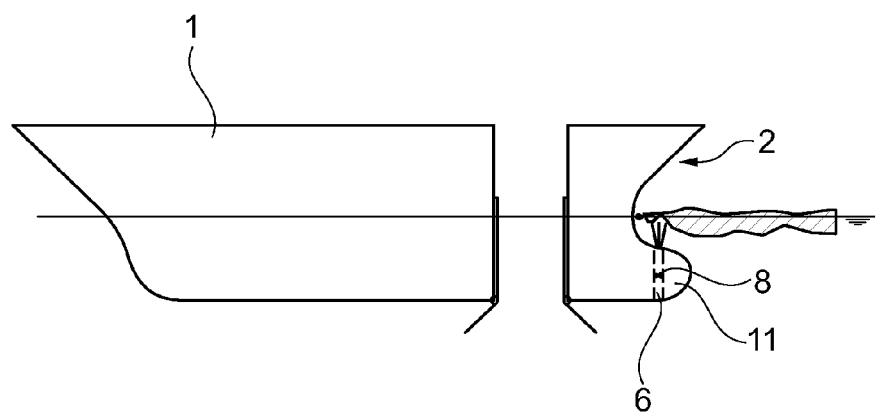
Figure 7:
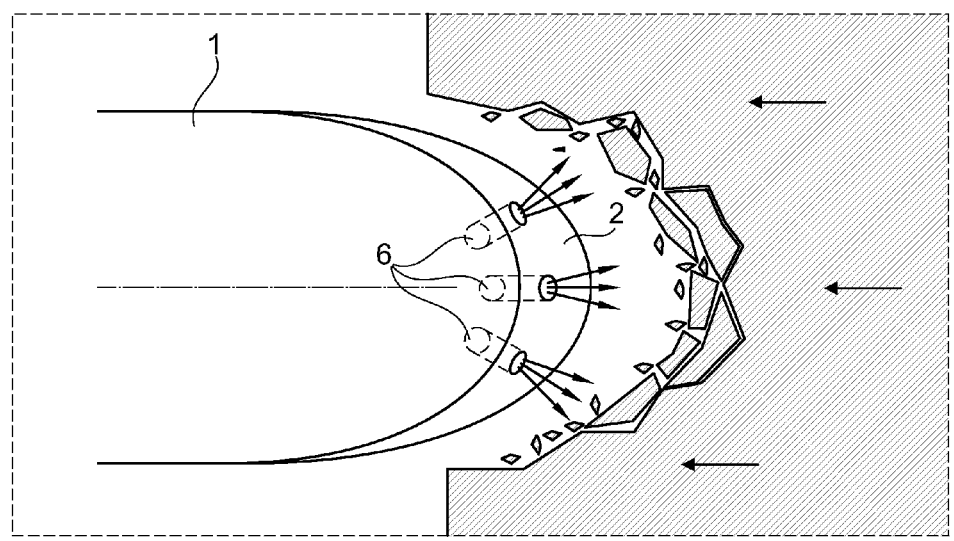
Figure 8:
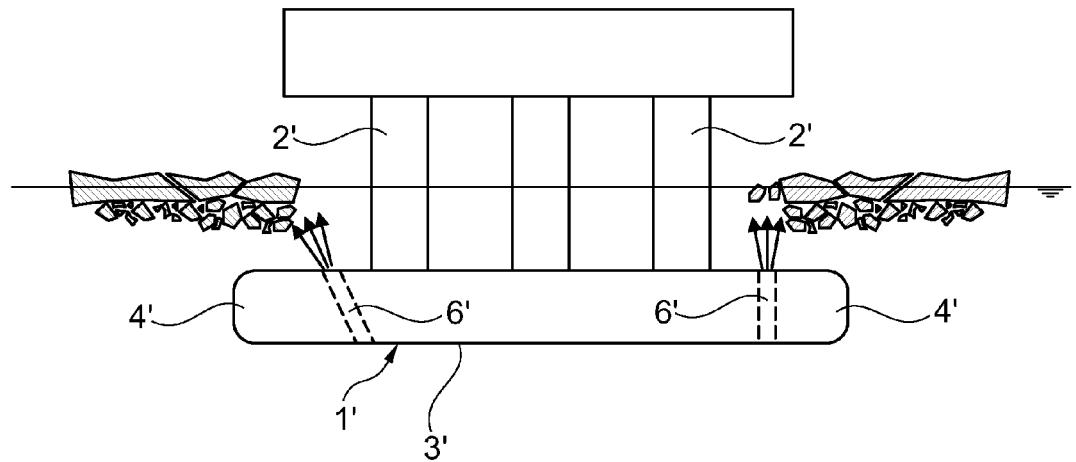
Figure 9:
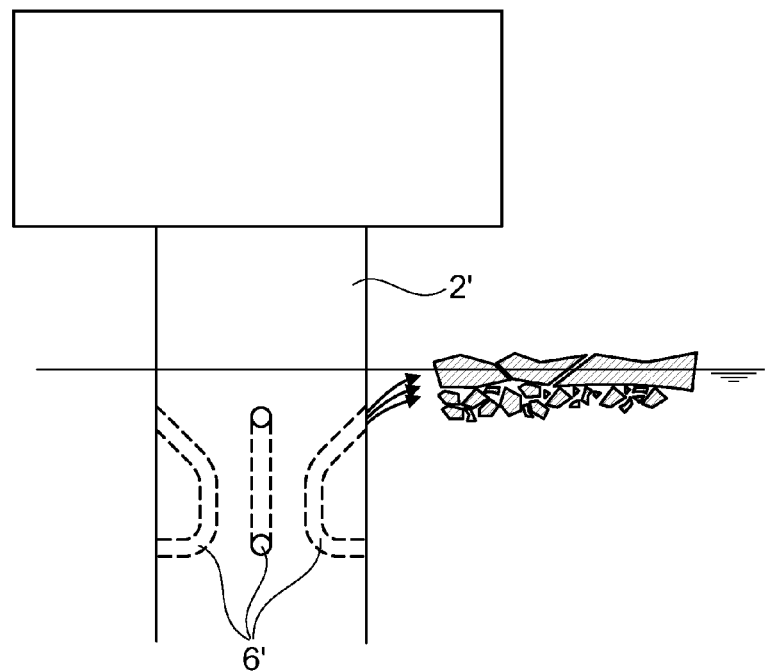

FIG. 5 shows the principle of applying the invention to a drilling ship, which is provided with one shape of the bow-like end, FIG. 6 shows schematically how to apply the invention to a drilling ship or to a production platform, which is provided with an alternative shape of the bow-like end, FIG. 7 illustrates the situation, in which the vessel according to the invention encounters the ice, FIG. 8 shows how to apply the invention to an oil drilling rig, and FIG. 9 shows an alternative embodiment of the channel arrangements according to the invention in the application according to FIG. 8.

In the drawings, reference number 1 refers to a hull of a vessel or a floating structure, which is provided with a bow structure, i.e. a bow-like end or a similar hull portion 2 and with a bottom 3 or a similar portion underneath. Especially with reference to the embodiment according to FIGS. 1-4, the bow-like end 2 is beneath the waterline of the hull equipped with a protruding part, i.e. a submerged protrusion 4, which may be provided with one or several flow channels 6, which encompass a pump or a propeller 8 for generating strong, mainly upwards directed flows of waters, and for leading them towards the ice field encountered by the bow-like end, as shown in the other figures.

FIGS. 1-4 show only one flow channel 6, which is divided into two branches 6a and 6b. It may, however, be preferable to have a plurality of channels provided in the area of the bow-like end, on which the ice primarily strikes, if so required, in other words depending on the structure of the vessel, its purpose of use and operating area, and thereby on the quality of the probable ice load in practical situations.

The purpose of the flows of water is, in addition to assisting with the ice breaking, also to reduce the friction between the hull and the ice and to provide in the vicinity of the hull a flow of water, which is directed away from the hull and at the same time tending to move the cracked-up ice blocks away from the hull.

In the embodiment according to FIGS. 1-4, above the submerged protrusion 4 on the bow-like end there is also another forward-directed protrusion 5, an underside of which is provided with surfaces 7 that slope inwards, obliquely towards the submerged protrusion 4 below. These sloping surfaces are very applicable for ice breaking. Moreover, the upper surface of the submerged protrusion 4 may preferably be made inclined, whereby, as soon as the bow-like portion encounters the ice field, one of said sloping surfaces is available for ice breaking together with the strong water flows passing through the flow channels 6.

The flow channel 6 extends through the submerged protrusion 4 so that the water to be led through it is taken from the area of the bottom 3 of the vessel. In this manner, the underneath orifice of the channel 6 is not susceptible to clogging by the ice and ice blocks detached from the ice field.

FIG. 5 shows the principle of applying the invention to a drilling ship, which is provided with a derrick 9 with drilling equipment and which anchored to the sea bottom by means of anchoring wires 10 or in some other similar way. Also in this case, the bow-like end 2 of the vessel is equipped with one or more flow channels 6, which are provided with a propeller or pump 8. In this case, the flow channel 6 itself is located obliquely with respect to the waterline, whereby also its flow of water is directed obliquely towards the approaching ice field.

The embodiment according to FIG. 6 differs from the one in FIG. 5 in that the bow-like end 2 encompasses a submerged protrusion in the form of an underwater bulge 11 formed at the bow structure 2, i.e. a so-called bulb, which is conventional in several types of vessels, including oil tankers. In this case, the flow channel or channels 6 and their flows of water are directed almost vertically upwards towards the ice field. Thus, the invention can be applied with advantage also to a tanker moving in an ice lane, since the provided flows of water tend to keep the ice lane open in the area of the bow-like end thereby facilitating essentially the travel of the vessel in the ice lane.

FIG. 7 illustrates the encounter of the vessel provided with flow channels 6 located at the bow-like end in accordance with the invention and the ice field, seen from above. Thus, depending on the case, the vessel may hold its position and the ice field moves towards it, as shown by arrows herein, or both the vessel and the ice field move with respect to one another, or the vessel attempts to move through the ice field. In any case, the flow channels 6 that are mainly located in the collision area of the bow-like end 2 and the ice field and the strong flows of water led from the channels contribute to the ice breaking and to the moving of the detached ice blocks away from the area of the bow-like end 2. Then, it is naturally advisable to turn the vessel towards the current direction of motion of the ice field and/or the vessel in order to make the arrangement function as efficiently as possible.

FIGS. 8 and 9 show how to apply the invention to a floating structure acting as a so-called semi-submersible oil drilling rig or a production platform, which encompasses a hull 1' with a bottom 3' with one or several bow structures, i.e. bow-like ends or similar hull portions 2', of which even a plurality may be provided with one or more flow channels 6'. These may be located obliquely or vertically in submerged protrusions 4' of the installation so that the strong flows of water generated by them are directed mainly or essentially upwards, towards the approaching ice field. Of said bow-like ends or similar hull portions 2', one is always appropriately turned so as to receive the main load of the ice field. The solution according to the invention may, however, be applied with advantage also in such a case, where the vessel is more or less surrounded by the ice field and its direction may vary according to the windiness and flow conditions.

In FIG. 9, the vertical hull portion or bow structure 2', which corresponds to the bow-like end, is provided with a number of flow channels 6', to which water is led from lower below. Depending on the angle of encounter of the ice and the hull portion 2', these flow channels together diminish the ice load essentially and thus make it possible to maintain the position of the vessel.

The flows in the flow channels 6, 6' can be arranged to be controlled all together or individually, or by desired groups. Thereby, it is also possible to use the flows of water for steering.

The invention is not limited to the shown embodiments, but several variations are conceivable within the scope of the appended claims.

The invention claimed is:

1. A vessel or a floating structure operating in ice-covered waters, comprising:
a hull with a bottom and with a waterline including at least one bow structure, which is exposed to a loading effect of ice while the ice or the vessel or floating structure is moving in the ice or an ice field,
wherein said bow structure, in an underwater part of the hull, is provided with at least one flow channel, the at least one flow channel being vertically or obliquely located with respect to the waterline and arranged to be directed towards the ice or the ice field in front of the vessel or floating structure, the bow structure comprising a forwardly protruding portion, the at least one flow channel having a first end disposed on an underside of the forwardly protruding portion and a second end on a top surface of the forwardly protruding portion, the at least one flow channel extending vertically or obliquely through the forwardly protruding portion and the at least one flow channel being oriented forwardly through the forwardly protruding portion, and
wherein the at least one flow channel is provided with a pump or a propeller for leading from underneath the bottom of the vessel or the floating structure upwards-directed flows of water through said bow structure towards the ice or the ice field in front of and encountered by the bow structure.

2. The vessel or a floating structure according to claim 1, wherein more than one flow channel is provided and wherein the flows of water in the flow channels are arranged to be controlled individually or by desired groups.

3. The vessel or a floating structure according to claim 1, wherein the at least one flow channel is arranged to branch.

4. The vessel or a floating structure according to claim 1, wherein a second forward-directed protrusion is provided above said forwardly protruding portion, and wherein an underside of said second protrusion is provided with surfaces that slope inwards, obliquely at said bow structure towards said forwardly protruding portion so that a notch provided with bevelled ice-breaking surfaces is formed between said second protrusion and said forwardly protruding portion.

5. The vessel or a floating structure according to claim 1, wherein said bow structure exposed to the loading effect of ice is shaped so as to be bevelled with respect to a sea level in the vicinity thereof.

6. The vessel or a floating structure according to claim 1, wherein said forwardly protruding portion is shaped so as to be bevelled with respect to a sea level in the vicinity thereof.

7. The vessel or a floating structure according to claim 1, wherein the vessel or floating structure is a drilling vessel equipped for drilling, recovering or storing oil or gas, which vessel or floating structure is provided with a drilling derrick with equipment arranged in the hull behind said bow structure as well as with anchoring wires for maintaining a position of the vessel or floating structure.

8. A method of using a vessel or a floating structure in ice-covered waters, which vessel comprises a hull with a bottom and a bow structure, which is exposed to a loading effect of ice in front of the vessel or floating structure while the ice or the vessel or the floating structure is moving in the ice or an ice field, wherein, in order to decrease the ice loading effect on the vessel or the floating structure, said bow structure is turned against a main approach direction of the ice or the ice field, and wherein vertically or obliquely upwards-directed flows of water are generated, from underneath the bottom of the vessel or the floating structure through said bow structure towards the ice or ice field in front of and encountered by the bow structure, wherein the bow structure comprises a forwardly protruding portion and a flow channel having a first end disposed on an underside of the forwardly protruding portion and a second end on a top surface of the forwardly protruding portion, the flow channel extending vertically or obliquely through the forwardly protruding portion and the at least one flow channel being oriented forwardly through the forwardly protruding portion.

9. The method according to claim 8, wherein said vertically or obliquely upwards-directed flows of water are generated by a pump or a propeller located in the flow channel in said bow structure.

10. The method according to claim 8, wherein said vertically or obliquely upwards-directed flows of water are used to reduce friction between the hull and the ice or the ice field.

11. The method according to claim 8, wherein said vertically or obliquely upwards-directed flows of water are used for steering the vessel.

* * * * *